Patented Oct. 9, 1945

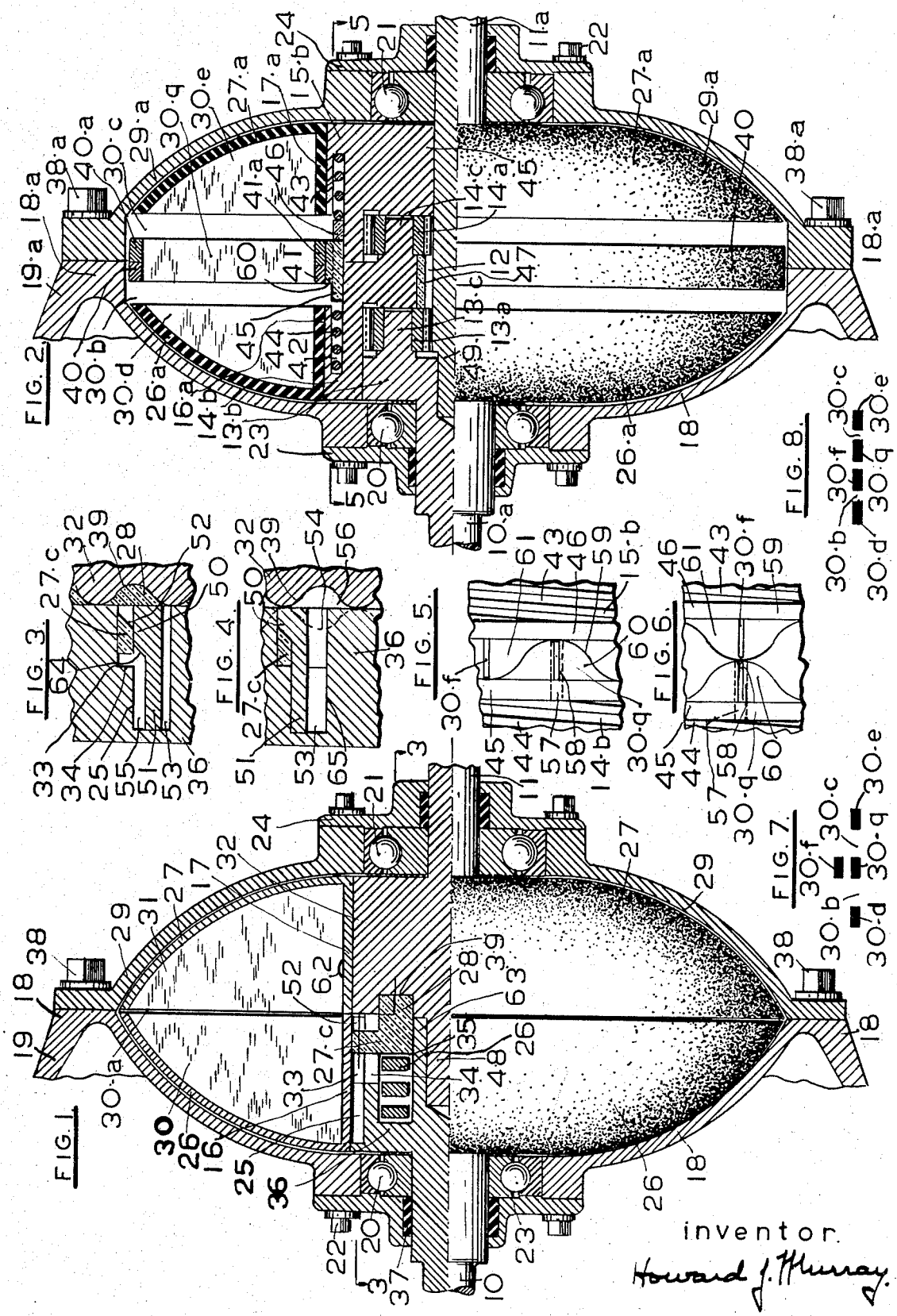

2,386,258

UNITED STATES PATENT OFFICE 2,386,258

FLUID DRIVE MECHANISM

Howard J. Murray, New York, N. Y.

Application October 25, 1940, Serial No. 362,777

15 Claims. (Cl. 74—189.5)

The present invention relates in general to an automatic fluid drive power transmission mechanism, and specifically relates to a device for automatically changing the fluid drive action of the fluid drive coupling of the said mechanism in accordance with the drive resistance of the driven member of the said mechanism.

One of the objects of the present invention is to provide a normally positive drive clutch arranged to automatically become a fluid drive clutch in accordance with the torque load on the driven member of the said clutch.

A further object of the present invention is to provide a simple form of fluid drive mechanism arranged with cam controlled fluid drive elements actuated by power derived from one of the power members of the said mechanism.

A still further object of the present invention is to provide a combination of cam drive connected fluid drive elements arranged so as to become fluid drive related in accordance with the torque load resistance on the driven element.

The present invention is a further development of the disclosure included in my U. S. patent application No. 358,062 filed September 24, 1940 entitled "Fluid drive mechanism."

While the present invention is obviously capable of use in any location wherein it is desired to transmit power from one power member to another power member, the present invention is obviously applicable to a power transmission device for use in connection with automotive vehicle construction, and it is in this connection that embodiments of the present invention will be described in detail.

Accordingly the present disclosure includes torque responsive fluid drive elements for effecting positive drive and fluid drive relations in a selective manner during periods of varying torque load on the driven element without shock or strain.

In one embodiment of the present disclosure a plurality of normally inactive fluid drive elements are cam related so as to become torque responsive thereby to accumulatively become fluid drive related with fluid drive intensity varying faster than the load increase on the driven member.

In the drawing:

Figure 1 is an embodiment of the present invention partly in vertical section taken axially of the main shaft.

Figure 2 is another embodiment of the present invention partly in vertical section taken axially of the main shaft.

Figure 3 is a plan view of a section of the means of Figure 1 taken along the line 3—3 looking in the direction indicated by the arrows and showing the normal relation of the cammed elements.

Figure 4 shows the cammed elements of Figure 3 in an operative position and the relative position of the cams.

Figure 5 is a plan view of a section of the means of Figure 2 taken along the line 5—5 of Figure 2 looking in the direction indicated by the arrows.

Figure 6 is another view of the means of Figure 5 showing the cammed elements and associated portions of the means of Figure 2 in torque responsive operated relation.

Figure 7 is a diagrammatic presentation of the vanes of the fluid drive elements of Figures 2, 5 and 6 showing the normally inoperative relation of the said vanes.

Figure 8 is a diagrammatic presentation of the elements of Figure 7 showing the torque responsive operative relation of the vanes of Figure 7.

There is shown by the means of Figure 1 of the drawing a new and novel self-controlled fluid drive mechanism including a pair of power shafts 10 and 11 disposed in axial alignment with their adjacent ends including the reduced portion 48 of the shaft 11 interfitted to provide proper bearing surface.

The power shafts 10 and 11 are normally drive related so that the said shafts have independent rotary movement respectfully in suitable bearings 20 and 21 supported in the casings 18 and 29. While either of the shafts 10 and 11 may be considered as the normal driving member of the mechanism, it will be understood for the purpose of this description that the shaft 10 is the normal driving member, and is operatively connected so as to be driven from a source of power (not shown) such as an internal combustion engine.

Accordingly the said shafts 10 and 11 are normally drive related so that the shaft 11 is the driven member, and is operatively connected to whatever mechanism (not shown) it is desired to drive.

The shaft 10 is preferably made of a good quality of steel and formed with a radially extending flanged portion 36 and axially extending annular portions 34 and 63 together forming an axially extending recess 35.

Two fluid drive elements 26 and 27 (see Figure 1) formed with fluid fins 30 and 31 are supported and axially positioned on the drive and driven power members 10 and 11 for rotation therewith as hereinafter described. The fluid drive element 27 is securely attached to the portion 32 of the normally driven member 11 by means of the axially extending portion 17. Any conventional securing means such as the screws 62 may be used. The fluid drive element 26 is formed with the axially extending portion 16. This portion 16 is securely attached to a plurality of axially extending portions 51 symmetrically positioned about the axis of the member 10 so as to collectively have a limited degree of rotational freedom on the portion 63 of the member 10 (see Figures 3 and 4). This degree is determined by the relation of the radial walls 25 and 65 as shown by the numerals indicating the spaces 53 and 55. Thus the fluid drive element 26 has a degree of rotational freedom relative to the normally driving member 10 until such freedom is eliminated by the action of a torque load impressed on the normally driven member 11 as hereinafter described.

An axially movable cammed member 27—c is formed with a plurality of axially extending cammed projections 28 extending in mating recesses 39 formed in the portion 32 of the member 11 and positioned and slidably supported on the axially extending portion 63 of the member 10. This cammed member 27—c has a limited degree of axial movement as determined by the mating cams 28 and 39 so that the member portions 27—c and 32 will relatively move so as to bring the cam surfaces 28 and 39 opposite each other as shown by Figure 4 along the axially extending guide wall 33 of the member 10. A spring 26 with preferably a tapering cross-section is positioned in the annular recess 35 so as to normally hold the cammed member 27—c in the inoperative position shown by Figure 3. The cammed member 27—c is formed with a second cammed portion 52 to operatively mate when axially moved with the cammed portion 50 of the rotatably limited (see space 53) member 51 as shown by Figure 4.

The casings 18 and 29 are secured together by means of the bolts 38 and a conventional gasket so as to form a leak-proof container for the rotatable elements of Figure 1. The end pieces 23 and 24 are secured to the casings 18 and 29 by means of the bolts 22 so that the fluid drive couple members 26 and 27 will be spaced apart as indicated by the numeral 30—a. The said end pieces 23 and 24 are formed so as to receive and position the fluid retainers 37 as shown by Figure 1. The casing portion 18 is formed with a bell housing portion 19 operatively attached to the vehicle upon which the device is to be installed and operated.

By means of Figure 2 there is shown a modification of the means of Figure 1 which employs more than two fluid drive elements. In this embodiment four fluid drive elements with fluid drive vanes 30—d, 30—f, 30—g and 30—e are arranged as shown in Figures 2, 5 and 7 so that the vanes 30—g and 30—f are normally fluid drive inactive to a considerable degree as hereinafter described. The webs 30—d, 30—g and 30—f are operatively connected with the member 10 and the vanes 30—e turn with the member 11 as hereinafter described.

The power members 10—a and 11—a are interfitted by means of the bearing portion 49 so as to be disposed in axial alignment. The members 10—a and 11—a are mounted for independent rotary movement respectfully in suitable bearings 20 and 21 in turn positioned and supported by the casings 18—a and 29—a secured together so as to form a fluid enclosure by means of the bolts 38—a.

While either of the power members 10—a and 11—a may be considered as the driving member of the means of Figure 2, for the purpose of this description, it will be understood that the member 10—a is the driving member, and is operatively connected to be driven from a source of power (not shown) such as an internal combustion engine. The conventional automotive vehicle clutch may be operatively placed between the source of power and the member 10—a if desired.

Accordingly the member 11—a is regarded as the driven member, and is operatively connected to whatever mechanism (not shown) it is desired to drive.

The members 10—a and 11—a are preferably made of a good quality of steel, and the shaft 11—a is formed with a plurality of splines or sun teeth 12 so as to operatively receive the planet teeth of a plurality of sets of planet gears 13—a and 14—a constantly in mesh drive relation with the annular teeth of the annular gears 14—b and 15—b. The member 10—a is formed with a radially extending portion 13—b in bearing relation with an axially extending portion of the annular gear 14—b.

The planetary arrangement of the sun, planet and annular teeth of the annular gears of Figure 2 is similar to the annular arrangement of the sun, planet and annular teeth of the gears of Figure 1 of my co-pending U. S. application Serial No. 358,062 filed Sept. 24, 1940.

The fluid drive elements 26—a and 27—a of Figure 2 are preferably moulded or cast with the inner walls 16—a and 17—a securely attached for rotation with their supporting annular gear members 14—b and 15—b by such conventional means as screws or bolts, or by a forced fit. The present disclosure contemplates that the fluid drive element 26—a (or 27—b) may be moulded of plastic material with the vanes 30—d and the walls 16—a and 26—a integral.

The fluid drive elements are preferably made of welded sheet metal of proper thickness so that the inner rims 41, 41a and outer rims 40 and 40d and the webs 30—g and 30—f may be welded together. Thus the rims 40 and 41 and the webs 30—g will constitute one fluid drive element, and the rims 40—a and 41—a and the webs 30—f will constitute a second fluid drive element. The fluid drive element 40 is rigidly secured to the cammed portion 60 (see Figures 5 and 6) including the closed annular ring portion 45. The cammed portion 61 (see Figures 5 and 6) including the closed annular ring portion 46 is rigidly secured to the fluid drive element 40—a. Thus the inner band 41 portion of the drive element 40 is secured to the cammed element 60, and the ring 41—a is secured to the cammed portion 61.

The cammed portions 60 and 61 are normally held in the mating position shown by Figure 5 due to the action of the cam seating springs 43 and 44 positioned in the annular recesses 42 formed in the outer portions of the annular gears 14—b and 15—b. The springs 43 and 44 press against the closed ring portions 45 and 46 to hold the cams 60 and 61 in the position shown in Figure 5.

After the said fluid drive elements 26—a, 27—a, 40 and 40—a including the vanes 30—d, 30—g, 30—f and 30—e are operatively assembled on the annular gears 14—b and 15—b, the power members 10—a and 11—a are positioned in the bearings 20 and 21 and the casings 18—a and 29—a are bolted together by means of the bolts 38—a. After the container formed by the casings 18—a and 29—a is properly filled with the selected fluid the end members 23 and 24 are bolted to the casings by means of the bolts 22 after the fluid retaining material 37 is in proper position.

The member 10—a may be attached to the source of power as the bell housing portion 19—a is moved into position for proper support on the vehicle to which the device is to be installed and operated.

In operation, let it be assumed that the source of motive power (not shown) is connected to the normally driving member 10 of Figure 1. Let it be further assumed for the purpose of this description, that the said source of power will rotate the said member 10 clockwise as viewed from the left hand end of the means of Figure 1.

The device to be driven, such as an automotive vehicle, is assumed to be connected to the normally driven member 11 through a conventional reversing unit (not shown) and that the normally driven member 11 is normally driven in the same rotational direction as the normally driving member 10.

The transmission casing including the portions 18 and 29 is assumed to be properly filled with a suitable fluid for both fluid driving and for lubricating the various movable portions within the said casings. One of the novelties of the present disclosure is that of providing a fluid drive power transmission mechanism in which the fluid drive medium may also be used to lubricate the movable parts employed in the said mechanism as well as to transmit power.

With the said normally driving member 10 rotating clockwise at constant speed (assumed as constant speed for the purpose of this description only, as of course the member 10 may rotate at variable speed) and without any appreciable impressed load torque on the normally driven member 11, all of the rotatable parts of the means of Figure 1 (except the bearings 20 and 21) will tend to rotate as a unit at the said constant speed about a common axis.

Now let it be assumed that a slight load torque is impressed on the normally driven member 11. The said member 11 will then normally tend to decrease slightly in its clockwise speed relative to the driving member 10. But the seating spring 26 is holding the mating cammed portions 28 and 39 of the cammed members 27—c and 32 (see Figure 3) in the mating position shown by Figures 1 and 3 and thus the slight torque load resistance impressed on the normally driven member 11 will not be sufficient to axially move the cammed portion 28 of the cammed member 27—c to the left to compress the spring 26 so as to permit the camming portions 28 and 39 to move relative to each other with a limited degree of axial and rotary movement. Thus the member 11 will remain in positive drive relation with the normal driving member 10. Now let it be assumed that the impressed torque load on the driven member 11 is further increased until the connecting force resolving action on the means of Figure 1 will be sufficient to overcome the axial force of the seating spring 26 to cause the camming portions 28 and 39 to move relative to each other to the left and thus compress the said spring 26. It is obvious that the means of Figure 1 will continue to transmit power from the member 10 to the member 11 at conventional direct drive conditions until the normal impressed load torque on the member 11 has been exceeded to move the cam portions 28 and 39 relative to each other to compress the spring 26. In this event there will be no fluid drive action between the elements 26 and 27 of Figure 1 as long as the normal impressed load torque on the member 11 is not exceeded.

Now let it be assumed that the impressed load torque on the driven member 11 is sufficient to overcome the axial resistance of the spring 26 and thus cause the cammed member 27—c to move axially to the left as shown by Figure 4.

The cammed axial projection 28 of the member 27—c will be moved axially to the left away from the recessed cammed portions 39 of the portion 32 to compress the spring 26 against its tension.

As soon as the fluid driving vanes 30 and 31 move relatively to each other there will exist a flow in the fluid medium and thus a fluid drive action between the said vanes 30 and 31. The segmental portions 51 are collectively rigidly connected to the inner rim 16 of the fluid drive element 26 as hereinbefore described, and the fluid drive element 26 and associated portions thereby have a limited degree of rotational freedom relative to the driving member 10. Thus any fluid drive action by the vanes 30 will react to cause the member 26 to rotate relatively counter-clockwise to the member 10. In this event, the segmental portions 51 attached to the fluid drive member 26 will tend to rotatably move against the cammed portion 27—c (see Figure 3). As the cammed portions 27 and 39 approach the maximum axial displacement position as shown by Figure 4, and before such a maximum displacement position is reached by the cammed portion 27 of the member 27—c, the cam surfaces 52 of the cammed portions 27 of the member 27—c will have been axially moved to the left sufficient to be in the path of the cammed surface 64 sufficiently to cause the now torque actuated surface 64 to cam engage with the surface 52.

The reaction between the vanes 30 and 31 will be transmitted to the portion 51 to rotate it in the space 53 formed in the member 10 to cause the cammed portion 50 to force the cammed portion surface 52 to the left toward the stop wall 34 (see Figure 1). Thus the cammed surfaces 64 and 52 will react under the rotational torque force of the member to axially move the cammed member 27—c to the left until it reaches the stop wall 34 as the member 51 moves to the stop wall 25 (see Figures 3 and 4). Thus the member 27—c will be moved into the locked position as shown by Figure 4. The axially movable cammed member 27—c is thus moved entirely out of the path of the mating cammed member 51 to permit the member 51 and the fluid drive element 26 to be moved into the operative position as shown by Figure 4. Under these conditions the cammed projections 28 have been moved axially with the member 27—c so as to be entirely out of the path of the cammed portion 32 of the normally driven member, and the means of Figure 1 thus become fluid drive related in turn to fluid drive relate the power members 10 and 11. The members 10 and 11 will continue to remain fluid drive related as long as the said impressed torque load on the member 11 is greater than the normal torque load as hereinbefore stated.

When this greater than normal torque load decreases to below normal, or to a value where the spring 26 can push the cammed segmental portions 27—c axially to the right in Figure 1, the portions 51 will be rotated clockwise (as viewed from the left hand end of the means of Figure 1 to the position as shown in Figure 3). The cammed projections 28 of the member 27—c will move into the mating recesses in the portion 32 of the normally driven member 11 and the mechanism of Figures 1 and 3 will again be in positive drive relation.

The mechanism shown by Figures 1, 3 and 4 is therefore torque responsive, and the power to operate the cams and to automatically change the mechanism from one form of drive to the other is derived from the driving member. All of the transmitted power will pass through the positive paths as shown by Figure 1 when the cammed members 27—c and 32 are in the positions shown, and through a differential fluid path when the cams are in the position shown by Figure 4.

When the normally driven member 11 becomes the driving member, the cam action between the cammed elements 27—c and 32 of Figure 1 will be the same as when the member 10 is the driving member, but the fluid drive action between the vanes 30 and 31 will tend to move the vanes 30 and thus the cammed portion 51 relatively clockwise faster than the said member 10 until stopped by the wall portion 65. In this event the cammed portion 64 of member 27—c will not act to lock the cams 28 free from the member 32, because the fluid drive relations between the webs 30 and 31 when the web 31 is driving will be to move the web 30 clockwise faster than the member 10 of Figure 2.

It should be noted that the fluid drive relation must always take place when the impressed load on the driven member is greater than normal torque load. Most of the time, the device will be operating at normal torque or less and thus there will be no molecular friction loss in the fluid medium because there will be no fluid drive action. In most automotive vehicles, direct drive relations hold for a greater portion of the operating intervals, and thus the present disclosure provided a highly efficient positive drive mechanism automatically becoming a fluid drive mechanism when required. The cammed member 27—c is torque responsive in its axial movement to automatically cause the rotatable means of Figure 1 to selectively become a positive drive or a fluid drive means according to the torque load on the driven member.

By means of Figure 2 there is shown a combination of means using more than two fluid drive elements. In this combination of means, the fluid drive elements 26—a and 27—a are not connected directly to the driving and driven members as shown of the means of Figure 1, but are drive related to the said members through planetary gearing so as to be differentially drive related to either member.

The fluid drive elements 40 and 40—a are cam connected to each other, and the element 40 is drive connected to the member 14—b with a limited degree of axial movement as hereinafter described. The fluid drive element 40—a has a limited degree of rotational freedom relative to the fluid drive element 40, and both fluid drive elements 40 and 40—a have a limited degree of axial freedom of movement relative to each other.

In the operation of the means of Figure 2, let it be assumed that the normal driving member 10—a is rotating clockwise at constant speed as viewed from the left hand end of the means of Figure 2. If there is no appreciable impressed load torque on the normally driven member 11—a there will be no appreciable force resolving action between the rotatable parts of the means of Figure 2. All the said rotatable parts will rotate clockwise as a unit at the same speed about the common axis of the members 10—a and 11—a.

If a slight load torque is now impressed on the driven member 11—a, the connecting force resolving action between the constantly mesh drive connected sun, planet and annular gears will vary accordingly as the speed of the driven member tends to decrease clockwise relative to the speed of the driving member. Sufficient impressed load torque on the member 11—a will cause a difference of speed between the said members 10—a and 11—a and thus a difference of speed between the fluid drive elements 26—a and 27—a depending on the differential speed drive relation of the said sun, planet and annular gears.

As long as there is no relative movement between the cammed members 60 and 61, the fluid drive elements 40 and 40—a will rotate with and at the speed of the fluid drive element 26—a. Initially the fluid drive action between the elements 26—a and 27—a will not be effective, because of the fluid vane arrangement of the fluid drive elements 26—a, 40, 40—a and 27—a as shown by Figure 7. The spaces 30—b and 30—c are so wide as to initially decrease the fluid flow from the vanes 30—d by permitting a partial short circuiting of the said fluid flow between the vanes 30—d and 30—g and 30—f. Furthermore, the vanes 30—d and 30—g and 30—f are initially rotating at the speed of the driving member 10—a. The fluid flow from the fluid drive elements 30—g and 30—f will also tend to become short-circuited in the openings 30—b and 30—c so that very little of the fluid flow and thereby very little power will be transmitted from member 26—a to 27—a.

In order to maintain the planetary relations of the sun, planet and annular gears it is obvious that a decrease in speed of the member 11—a (with member 10—a rotating at constant speed) will necessarily cause a clockwise increase in speed of the annular gears 14—b and 15—b. Because of the cascade differential arrangement of the gears of Figure 2, the clockwise speed of the annular gear 15—b will increase faster than the clockwise speed of the annular gear 14—b. Thus the difference in speed of the vanes 30—d and 30—e will increase with decrease in speed of the member 11—a. With proper design the difference in speed between the vanes 30—d and 30—e may increase faster than the decrease in speed of the member 11—a.

The partially short-circuited fluid drive action between the elements 26—a and 27—a will be increased with increase of torque load on the member 11—a. The fluid drive actions of the vanes 30—g and 30—f will depend entirely on the relations of the cammed portions 60 and 61. If the torque acting on the vanes 30—g and 30—f is sufficient to move the cammed portions 60 and 61 relative to each other an accumulative and progressive drive control action will be initiated by the means of Figure 2. The cammed member 61 and thereby the vanes 30—f will rotate relative to the cammed member 60 and the fins 30—g. The movement will tend to compress the seating springs 42 and 43 to move the cammed member 60 and thus the fluid drive element 40 axially to the left along the splines 58 (see Figures 5 and 6) formed on the annular gear 14—b to receive the mating recess 57 formed on the member including the closed ring portion 45 and the cammed portion 60. Thus the vanes 30—g will move axially to the left as the vanes 30—f move obliquely against the spring 43 to the positions shown by Figure 8.

The fluid drive element 40 includes the vane portions 30—g, cammed portion 60, closed ring portion 45, and inner ring portion 41. The fluid drive element 40—a includes the vane portions 30—f, cammed portion 61, closed ring portion 46, and inner ring portion 41—a.

Any relative movement of the vanes 30—g and 30—f from the positions shown by Figure 7 to the positions shown by Figure 8 will cause an increase of fluid drive action between the members 26—a and 27—a, and in the same manner, any increase in the fluid drive action between the members 26—a and 27—a will vary the relative movement of the vanes 30—g and 30—f.

An increase in fluid drive action of the vanes 30—g and 30—f will increase the reaction between the cammed portions 60 and 61 and the compression of the seating springs 43 and 44. Such action will cause further relative movement between the vanes 30—g and 30—f. The openings 30—b and 30—c will decrease and thus any short-circuiting of fluid flow action will decrease as the vanes 30—g move axially and the vanes 30—f move obliquely to the positions shown by Figure 8. The fluid drive action between the vanes 30—d and 30—e will be intensified in an accumulative manner by power accumulatively derived from the driving member 10—a. The fluid drive elements of Figure 2 are self-energizing to control the speed drive relations of the members 10—a and 11—a as a function of the torque load on the driven member.

The cams 60 and 61 and the seating springs 43 and 44 may be provided so as to desirably limit the self-energizing action. The spring resistance to the camming action may vary in intensity faster than the increase of the relative movement between the cammed members 60 and 61. The fluid drive elements of Figure 2 are torque responsive to react on the planetary gearing to create connecting torque converting action between the sun, planet and annular gears and therethrough the members 10—a and 11a.

The means of the modification shown by Figure 2 provide an automatic self-energizing fluid drive control mechanism varying in control intensity in accordance with the torque load on the driven member, or varying in accordance with some predetermined action of the cams 60 and 61 and the springs 43 and 44. For example, the springs 43 and 44 may be formed so as to present a tapering resistance.

A portion of the power transmitted from the member 10—a to the member 11—a will always be transmitted through the plurality of positive toothed power transmitting paths provided by the sun, planet and annular gears of the means of Figure 2. The fluid drive elements collectively act as a fluid control in accordance with the load torque on the driven member to vary the power absorbed or shunted through the fluid path.

This is true, because the fluid drive elements as hereinbefore described act as a self-energizing frictionless brake varying in the intensity of its holding (control) action in accordance with the difference in speed of the said driving and driven members to control the transmission of power through the various paths collectively provided by the differential gearing. The maximum flow control action will occur when the vane portions of the said fluid drive elements are in the relation as shown by Figure 8.

Now let it be assumed that the torque load on the driven member 11—a is decreased. The relative clockwise speeds of the annular gears 14—b and 15—b and thus the relative clockwise speeds of the fluid drive elements 26—a and 27—a will decrease. This is true, because normally the speed of the member 11—a will increase as its load is decreased. The fluid flow reaction between the elements 26—a and 27—a will decrease, and the torque pressure holding the springs 43 and 44 will decrease. With sufficient decrease of impressed torque load on the member 11—a the compressed springs 43 and 44 will return the cammed members 60 and 61 and thus the vanes 30—g and 30—f to the positions shown by Figure 7.

The springs may be formed so that the cams 60 and 61 cannot pass each other. The cammed members 60 and 61 may be stopped by the compressed springs 43 and 44 so that the cam 61 cannot reach the position as shown in Figure 6. If the means of Figure 2 are adjusted so that the cams 60 and 61 may pass each other, then the torque resolving action of the means of Figure 2 will be self-limiting because the reactions between the cammed members 60 and 61 cannot exceed that required to cause the said cams to overrun each other.

The arrangement of means as shown by the modification of Figure 2 will co-act to produce a comparatively large starting torque on the member 11—a, because the fluid drive action of the fluid drive elements reach a maximum drive action with the normally driven member 11—a at rest. This is true, because the annular gears 14—b and 15—b will reach the maximum clockwise speeds with the member 11—a at rest. The maximum difference of speed of the fluid drive members 26—a and 27—a will occur when the member 11—a is at rest. Therefore, the maximum fluid drive action, and the greatest differential force resolving action of the annular gears will occur to tend to move the member 11—a.

When the normally driven member 11—a becomes the driving member, the rotatable elements of Figure 2 will all rotate clockwise as a unit at the same speed about a common axis as long as no appreciable torque load is impressed on the now driven member 10—a. With sufficient load impressed on the now driven member 10—a its clockwise speed will normally decrease. The annular gears 14—b and 15—b will now decrease in clockwise speed. The annular gear 15—b will decrease in clockwise speed faster than the gear 14—b. Further increase of impressed torque load on the member 10—a will cause the annular gears 14—b and 15—b to continue to decrease in clockwise speed, but the difference in speed of the gears 14—b and 15—b and thus the fluid drive action of the fluid drive elements will increase. The torque reactions of the differential gearing will increase to the extent that the cammed members 60 and 61 will be moved relative to each other to tend to move the fluid drive vanes 30—d, 30—g, 30—f and 30—e into the fluid drive relations as shown by Figure 8.

As the clockwise speed of the members 14—b and 15—b continues, the members will pass through zero speed and thence rotate counterclockwise one after the other.

This vane moving action will be progressive and accumulative because the fluid moving action of the vanes 30—g and 30—f will increase as the said vanes 30—g and 30—e are moved into a line with the vane 30—d. This increase in fluid drive intensity will cause further cam action between the cammed members 60 and 61 to further increase the web moving action and so on.

With proper design the collective fluid drive action of the vanes 30—d, 30—g and 30—f operatively constituting one of the fluid drive elements of a fluid drive couple, the fluid drive action of the means of Figure 2 may be controlled so as to increase in intensity as a function of the increase of impressed load torque on the member driven.

The seating springs 43 and 44 may be provided so as to produce resistance against compression varying faster or slower than the axial movement of the cammed members 60 and 61. In any event a predetermined action between the springs, cams, annular gears and fluid drive elements may be obtained.

If the load torque on the member 10—a is now decreased the connecting force resolving action of the means of Figure 2 will decrease. The speed of the now driven member 10—a will normally increase (the speed of the now driving member 11—a remaining constant as hereinbefore stated). The fluid drive action between the vanes of the fluid drive elements 26—a, 40, 40—a and 27—a will decrease. The springs 43 and 44 will tend to move the cammed members 60 and 61 axially to the position shown by Figures 2 and 5. With sufficient load decrease on the member 10—a the springs 43 and 44 will be able to move the cammed members and the associated vanes to the positions shown by Figures 2, 5 and 7. The fluid drive action between the members 26—a and 27—a will again be reduced to a minimum and the molecular friction loss in the fluid medium will be reduced to a minimum.

In conclusion, it will be understood that the present disclosure provides cammed fluid drive control means for progressively and accumulatively effecting drive relations between a driving member and a driven member at different speed-torque ratios. The self-energizing action can be varied or limited relative to the torque load imposed on the driven member. The power for operating the cams and cammed members is also derived from the driving member as a function of the load torque impressed on the driven member. A fluid drive control means (see Figure 2) is provided by this disclosure whereby fluid pressures are progressively and accumulatively produced and employed in a static and/or kinetic manner so as to cause force with torque responsive varying mechanical advantage to permit one member to speed drive another member according to the load torque on the said driven member.

While I have shown and have described and pointed out in the annexed claims certain new and novel features of my invention, it will be understood that certain well known equivalents of the elements illustrated may be used, and that various other substitutes, omissions and changes in the form and details of the devices illustrated and in their operation may be made by those skilled in the art without departing from the spirit of my invention.

Having thus described my invention, I claim:

1. In a self-energizing drive control device, the combination of a driving rotor, a driven rotor, a fluid and a fluid drive means in drive relation, said means including cascaded planetary gearing sets a fluid coupling element drive connected to one of the rotors through one of the said sets, a second fluid drive element drive connected to the other rotor through another of the said sets, a third fluid drive element and a fourth fluid drive element formed so as to be resiliently cam drive connected to each other, said third and said fourth drive elements fluid drive related to the said second fluid drive element, said cam drive connections fluid controlled for causing the said third and fourth fluid drive elements to move axially relative to each other in accordance with the difference in speed of the said rotors as they are rotated relative to each other to co-operate to vary the fluid drive action of all the said elements.

2. The combination of drive and driven rotors and drive related drive control means, said control means including a fluid, cascaded planetary gearing sets, a first fluid drive element drive connected to one of the said sets, a second fluid drive element drive connected to another of the said sets, and associated torque responsive and fluid responsive fluid drive elements, said fluid responsive elements mounted for rotation with the said second element for a limited degree of relative rotary and resilient axial movement to each other so as to vary the fluid drive relation of all the said elements of the said control and therethrough the drive relation of the said rotors.

3. In a fluid drive control organization, the combination of a pair of rotors and a fluid drive control means in differential drive relation about a common axis, said organization including a fluid drive element gear drive related to one of the rotors, a fluid drive element positively drive related to the other rotor and further fluid drive elements each provided with an element of a cam, said cam elements co-operating according to the difference in speed of the said rotors to vary the fluid drive relation of the said rotors.

4. In a drive control, the combination of a pair of rotors and a fluid drive control in drive relation, said control including fluid drive elements in drive relation with the rotors, and further cammed fluid drive elements, said further fluid elements operatively positioned between the said rotor drive related elements, said further elements cam actuated relative to each other and mounted for rotation by one of the said fluid drive elements so as to vary their axial and rotative relation to each other and to the said drive related elements, resilient means positioned between the said drive related elements and the said further elements and co-operating with the cammed portions of the said further elements to vary the fluid drive relation in accordance with the difference in speed of the said rotors, said actuation varying the intensity of the fluid drive action of the said control in accordance with the said difference in speed.

5. The combination of a driving member, a driven member and a drive related fluid drive control means operatively positioned therebetween, said means including a fluid and two associated fluid drive members in fluid drive relation with each other and in differential drive relation with the said drive and driven members, a plurality of resiliently cammed fluid drive elements in cam drive relation with each other, one of said cammed fluid elements in drive relation with one of the said fluid drive members, said cam drive relation varying according to the difference in speed of the said members.

6. In a gear control, the combination of driving and driven sun, planet and annular gears in differential drive relation, a fluid and fluid drive elements fluid drive related to each other, certain of the said elements positively drive related to the said annular gears, certain other of the said fluid drive elements provided with torque controlled camming means, said camming means mounted on one of the said annular gears so as to have a limited degree of movement relative to each other and to the said annular gear thereby fluid drive relate all the said fluid drive elements according to the difference in speed of the said annular gears.

7. In an automatic power transmission, the combination of a pair of rotors in drive relation, a fluid, and fluid drive means differentially drive connected to the said rotors and fluid drive related to a limited degree, and further fluid drive means cam drive connected to each other and drive connected to one of the said differentially connected fluid drive means, said cams operatively responsive to a difference in speed of portions of the said differentially drive connected means to cause the fluid drive means to become fluid drive active to a greater degree in a progressive manner in accordance with the torque load on one of the said rotors.

8. In a power transmission mechanism, the combination of a pair of rotors, cascaded planetary gearing and a fluid drive control in differential drive relation, said control including certain impeller and runner fluid drive elements positively gear drive connected to the said rotors through the said gearing, and further fluid drive elements mounted for rotation with the said impeller element cam drive related to each other and fluid drive related to the said certain fluid drive elements, said further elements axially positioned relatively to each other and to the said runner and said impeller as a function of the difference in speed of the said rotors.

9. In a fluid drive device, the combination of a pair of rotors, a fluid and gear drive related fluid drive means, said means including fluid drive impeller and runner elements in gear drive relation with the rotors, and further fluid drive elements formed with operatively associated camming portions, resilient means axially positioned between the said impeller and runner portions and the said cam portions, said cammed portions controlled by the relative speed of the said rotors for varying the fluid drive action of the said impeller, runner and further element means, said further fluid drive elements mounted for rotation with the said impeller element.

10. In a fluid drive, the combination of a pair of rotors mounted for relative rotation, a fluid drive control including impeller and runner fluid drive elements for causing the said rotors to normally tend to rotate at the same speed, said control including further fluid drive elements, said further elements formed with operatively associated resilient cams arranged for moving the said further elements relative to each other with two modes of motion, said cams mounted for rotation with the said impeller and controlled by the relative speed of the said rotors for causing the fluid control to begin to function.

11. In a fluid control for power transmission mechanism including a driving member, a driven member, a fluid medium, cascaded planetary gearing, a fluid drive element drive related to the said driving member through the said gearing, another fluid drive element drive related to the said driven member and further fluid drive elements each formed with an element of a cam, said cam elements mounted for rotation with one of the said fluid drive elements so as to be operatively associated by power derived from one of the members through the said fluid according to the difference in speed of the said members thereby to control the fluid drive relations of all the said fluid drive elements.

12. In a device of the class described, a fluid, a driving member, a driven member, and a fluid drive control means therebetween, said control means including cascaded planetary gearing, a first fluid drive element drive related to the driving member through one of the cascade sets, a second fluid drive element drive related to the driven member through a second cascade set, and further fluid drive elements formed so as to be resiliently cam drive related and fluid operated by the said fluid according to the difference in speed of the said members, said further elements mounted for a limited degree of relative axial movement between the said first and second elements and drive related to an element of one of the said cascaded sets.

13. In a device of the class described, the combination including a driving member, a driven member, a fluid medium, and a fluid drive control means in differential drive relation, said control means including an impeller element in drive relation with the said driving member, a runner element in drive relation with the said driven member and two fluid drive elements operatively positioned between the said impeller and said runner and mounted for rotation with the said impeller, said two elements formed with camming portions actuated by power derived from the driving member according to the difference in speed of the said members, said camming acting to move the said two elements with two modes of motion relative to each other.

14. In a device of the class described, the combination including a driving member, a driven member and a fluid drive control mechanism operatively positioned therebetween, said mechanism including an impeller element drive related to the said driving member, a runner element drive related to the said driven member, two fluid drive elements mounted on the said impeller element for rotation therewith, said two elements formed with cammed portions, and resilient means for causing the said portions to be moved relative to each other with two modes of motion as the portions are rotated with the said runner in the mechanism fluid.

15. In a device of the class described, the combination including a driving member, a driver member, a fluid medium and a fluid drive contro mechanism in differential gear drive relation in the said fluid, said mechanism including an impeller element in gear drive relation with the driving member, a runner element in gear drive relation with the said driven member, a pluralit of cammed fluid drive elements mounted fo rotation with the said runner element, sail mounting arranged so that the said cammed ele ments are operatively associated as the said run ner is rotated in the said medium, said associa tion causing relative movement of the sai cammed elements in two planes, and resilien means positioned so as to tend to oppose sucl relative movement.

HOWARD J. MURRAY.